Feb. 13, 1951   R. A. SFORZINI   2,541,108
COOLING OF ANNULAR COMBUSTION CHAMBER FUEL MANIFOLDS
Filed Aug. 6, 1947
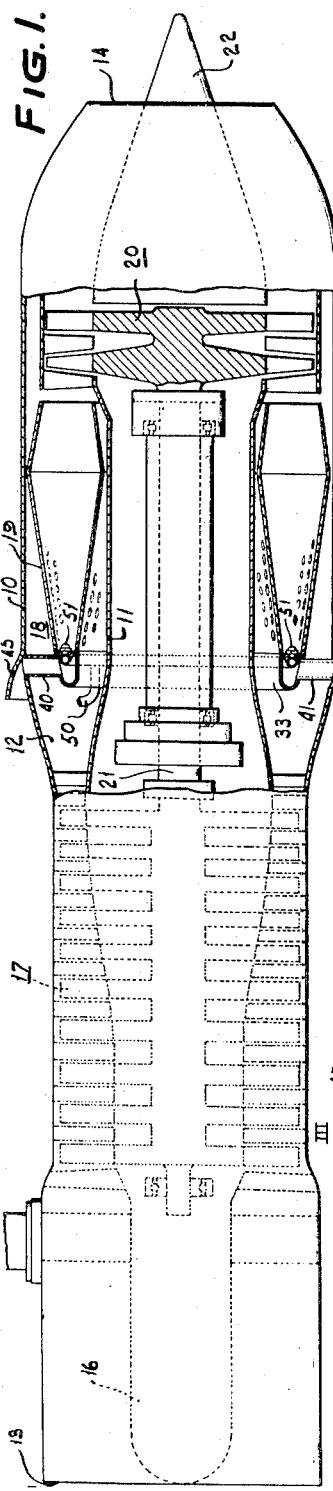
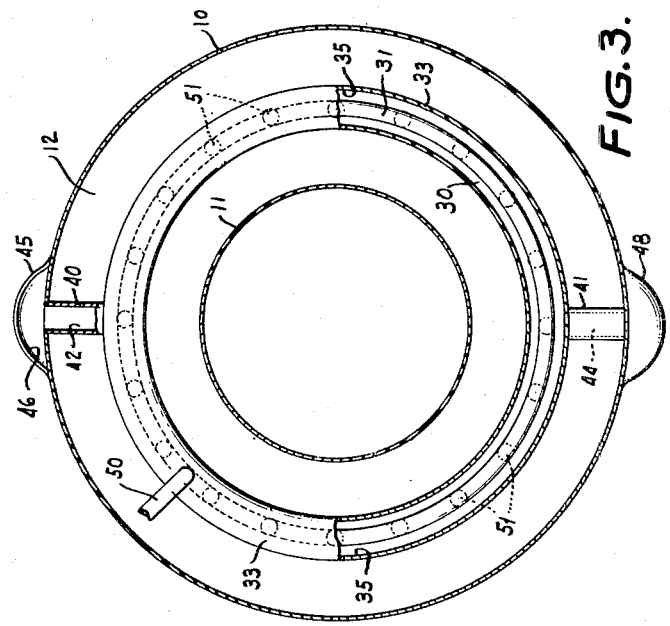
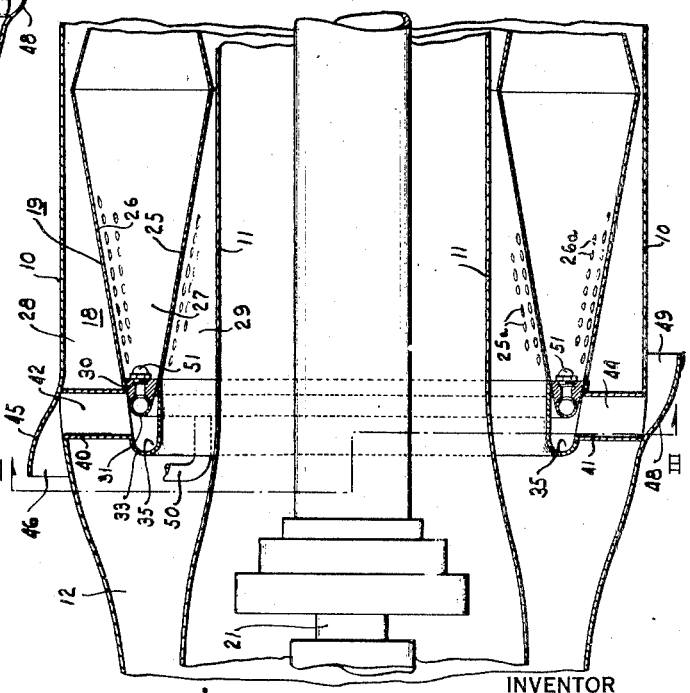
INVENTOR
ROBERT A. SFORZINI
BY
ATTORNEY Patented Feb. 13, 1951

2,541,108

UNITED STATES PATENT OFFICE 2,541,108

COOLING OF ANNULAR COMBUSTION CHAMBER FUEL MANIFOLDS

Robert A. Sforzini, Toledo, Ohio, assignor to Westinghouse Electric Corporation, East Pittsburgh, Pa., a corporation of Pennsylvania Application August 6, 1947, Serial No. 766,716

5 Claims. (Cl. 60—44)

This invention relates to gas turbine engines and more particularly to a fuel combustion apparatus for an aviation gas turbine engine.

A gas turbine engine of the type employed on aircraft will necessarily be subjected to severe extremes in temperature and sudden changes in operating conditions, giving rise to structural and operational problems that are often difficult to analyze and overcome. One problem is that of proper combustion of fuel, particularly during operation of the gas turbine engine at high altitudes where low atmospheric pressure and intense cold are apt to effect undesired premature vaporization of the fuel in the manifold, inducing a condition known as "vapor lock."

One well known form of aviation gas turbine engine comprises a streamlined casing structure having a through passageway leading from a forward air intake opening to a rear propulsion fluid discharge nozzle. Mounted in this casing structure are an axial flow compressor, a fuel combustion apparatus and a gas turbine. The compressor is operative to draw air through the front intake opening for delivery under pressure through the combustion apparatus to the turbine, which, in turn, drives the compressor. Unexpended motive fluid under pressure is then discharged from the turbine by way of the nozzle to establish a propulsion force. For suppplying fuel to operate such an engine, it has been proposed to provide an annular fuel manifold for feeding fuel through a plurality of circumferentially spaced atomizing nozzles disposed in the combustion apparatus.

During operation of the gas turbine engine at maximum speed and at high altitude, the pressure of fuel in the manifold may become very low while the combustion process tends to heat up the manifold to a degree causing some of the fuel to change from the liquid to a gaseous state. Accumulation of gaseous fuel in the top of the manifold may cause a vapor lock condition, as a consequence of which uniform supply of fuel may be impeded to an extent resulting in unfavorable temperature distribution and violent pulsations within the combustion apparatus of the engine.

It is an object of my invention to provide an improved fuel combustion apparatus for a gas turbine power plant having features of construction adapted to overcome the aforesaid difficulties.

Another object of the invention is the provision of novel means for cooling the fuel manifold of a gas turbine power plant of the type just described, to minimize formation of fuel vapor which might tend to cause vapor lock.

Other objects and advantages of the invention will appear in the following more detailed description thereof taken in connection with the accompanying drawing, in which:

Fig. 1 is a schematic elevational view, partly in section, of a gas turbine power plant embodying an improved combustion apparatus constructed in accordance with the invention;

Fig. 2 is a fragmentary elevational view, in enlarged detail, of the combustion apparatus forming part of the power plant shown in Fig. 1; and Fig. 3 is a sectional view taken substantially along the line III—III of Fig. 2.

Referring to Figure 1 of the drawing, an illustrative gas turbine power plant of the type with which my invention may be associated may comprise an outer casing structure 10 in which is supported an inner casing structure 11 forming an annular passageway 12 extending longitudinally from a forward intake opening 13 to a rearward discharge nozzle 14. The power plant is adapted to be mounted in or on the fuselage or wing of an aircraft with the intake 13 pointed in the direction of flight. Mounted within the casing 10 along the longitudinal axis thereof are a fairing member or core section 16 which may house auxiliary control apparatus (not shown), an axial-flow compressor 17, combustion apparatus 18 including a generally annular apertured fuel combustor or basket structure 19, and a two-stage turbine 20, the rotor of which is operatively connected to the rotor of the compressor 17 by means of a common shaft 21. The shaft 21 may be journaled in suitable bearings (not shown) carried by the inner casing structure 11. Rearwardly of the turbine 20 is mounted a centrally disposed tailpiece 22 which may be arranged for adjustment to vary the flow area of the discharge nozzle 14.

In operation, air entering the intake opening 13 flows through the compressor 17, which delivers the air under pressure to the combustion apparatus 18, wherein temperatures ranging between 900° and 3000° F. may be attained. From the combustion apparatus 18, the heated motive fluid under pressure is expanded through the turbine 20 and is then discharged through the nozzle 14, usually in the form of a jet establishing a propulsion force.

As is best shown in Figure 2 of the drawing, the basket structure 19 of the combustion apparatus 18 comprises frusto-conical inner and outer walls 25 and 26, respectively, the outer wall 26 having its smaller end disposed adjacent the larger end of the inner wall 25 at the upstream end or inlet portion of the combustion apparatus. Formed between the walls 25 and 26 is a combustion chamber 27 which communicates with outer and inner chambers 28 and 29 by way of a plurality of apertures 26a and 25a formed in the respective walls 26 and 25.

According to the invention, the converging ends of the walls 25 and 26 are secured to suitable flanges 30 carried by an annular fuel manifold 31, which is disposed concentrically within the passageway 12 intermediate the outer casing structure 10 and inner casing structure 11. For supporting the manifold 31 there is provided an annular fairing structure 33, the closed leading end of which is directed forwardly or into the stream of fluid under pressure delivered by the compressor, and the trailing edges of which are suitably secured in sealing relation with the annular flanges 30 carried by the manifold 31. Since the fairing structure 33 is considerably larger in diameter than the manifold 31, an annular ventilating chamber 35 is thus provided within the fairing structure encompassing the major surface of the manifold. A plurality of hollow radially disposed strut members, in the present case, two strut members 40 and 41, are provided for supporting the fairing structure 33 from the outer casing structure 10. The strut member 40 has formed therein a passage 42 which communicates with the atmosphere by way of a suitable aperture formed in the outer casing structure 10, and also with the ventilating chamber 35 by way of a smaller aperture formed in the fairing structure 33. A passage 44 formed in the strut member 41 provides communication from the ventilating chamber 35 to the atmosphere by way of another suitable aperture formed in the casing structure 10. If desired, an intake louvre 45 having a forwardly directed opening 46 may be secured to the casing structure 10 adjacent the opening therein communicating with the passage 42. Similarly, a discharge louvre 48 having a rearwardly directed opening 49 may be mounted on the casing structure 10 adjacent the opening therein communicating with the passage 44.

The fuel manifold 31 is adapted to be supplied with fuel under pressure through the medium of a conduit 50 leading to a suitable fuel supply means (not shown), and is connected to a plurality of fuel nozzles 51 opening into the upstream end of the combustion chamber 27. As indicated in Fig. 3, the fuel nozzles 51 are circumferentially spaced with relation to the manifold in order to effect desirable uniform distribution of fuel into the combustion chamber.

In operation, air under pressure will be introduced by ram through the opening 46 and into the ventilating passage 35 in the fairing structure 33 for cooling the fuel manifold 31, exhaust flow of the air being effected by way of the passage 44 in the strut member 41 and opening 49. Thus, while the combustion process effected within the combustion apparatus 18 by the burning of atomized fuel supplied by way of the manifold 31 and nozzles 51 may build up an extremely high temperature during operation of the engine at a high altitude, the flow of cold air over the surface of the manifold 31 exposed within the chamber 35 will effectively minimize formation of fuel vapor in the manifold. The constant supply of fuel in a liquid form through the conduit 50 to all parts of the manifold 31, and consequently through all of the plurality of nozzles 51 communicating therewith, is thus insured, since the continuous circulation of cooling air through the ventilating chamber 35 in contact with the manifold 31 prevents formation of any critical amount of fuel vapor, which might otherwise accumulate in the upper portion of the manifold and block a number of the upper nozzles.

From the foregoing, it will now be apparent that the improved fuel manifold and combustion apparatus constructed in accordance with my invention can be installed in a gas turbine power plant of existing design for increasing the efficiency and reliability of the engine while operating at high altitudes. It will also be seen that the improved construction further provides a convenient means for supporting the fuel manifold and adjacent portions of the combustion apparatus within the casing of the power plant.

While the invention has been shown in but one form, it will be obvious to those skilled in the art that it is not so limited, but is susceptible of various changes and modifications without departing from the spirit thereof.

What is claimed is:

1. In a combustion apparatus for a gas turbine power plant having a substantially cylindrical outer casing and an annular combustion chamber structure supported in spaced relation therein, the combination of an annular fuel manifold mounted adjacent the upstream end of said combustion chamber structure, a plurality of nozzles for supplying fuel from said manifold to the combustion chamber, a substantially annular fairing structure mounted in spaced encasing relation about said manifold, and a plurality of hollow strut members for supporting said fairing structure and manifold within said outer casing, said strut members having passages for circulating atmospheric air within said fairing structure.

2. In a combustion apparatus for a gas turbine power plant having a substantially cylindrical outer casing and an annular combustion chamber structure supported in spaced relation therein, the combination of an annular fuel manifold mounted adjacent the upstream end of said combustion chamber structure, a plurality of nozzles for supplying fuel from said manifold to the combustion chamber, a substantially annular fairing structure mounted in spaced encasing relation about said manifold, a first hollow strut member extending from said outer casing to said fairing structure for introducing cooling air into said fairing structure by ram, and a second hollow strut member extending from said outer casing to said fairing structure for discharging air therefrom.

3. In a combustion apparatus for a gas turbine power plant having a substantially cylindrical outer casing and an annular combustion chamber structure supported in spaced relation therein, the combination of an annular fuel manifold mounted adjacent the upstream end of said combustion chamber structure, a plurality of nozzles for supplying fuel from said manifold to the combustion chamber, a substantially annular fairing structure mounted in spaced encasing relation about said manifold, a pair of hollow strut members connecting said fairing structure to said outer casing, an intake louvre carried by said outer casing for directing a stream of cooling air through one of said strut members to said fairing structure, and an exhaust louvre carried by said outer casing adjacent said outer casing for discharging said air from said structure.

4. In an aviation gas turbine power plant of the type including a casing having an annular fluid flow passageway and an apertured structure defining a combustion chamber concentrically interposed therein, in combination, an arcuate fuel manifold communicating at a plurality of points with the upstream end of said combustion chamber, an arcuate hollow fairing structure mounted in said passageway and adapted to enclose said manifold for providing a ventilating passage encompassing the exterior surface thereof, and hollow strut elements adapted to support said fairing structure from said casing, said strut elements having inlet and outlet passages for circulating cold air by ram through said passage in said fairing structure.

5. In an aviation gas turbine power plant of the type including a casing having an annular fluid flow passageway and an annular structure defining a combustion chamber concentrically interposed therein, in combination, an arcuate fuel manifold communicating at a plurality of points with the upstream end of said combustion chamber, said manifold having flanges formed thereon, an arcuate hollow fairing structure encompassing said manifold and having lateral marginal portions secured to said flanges for enclosing a manifold cooling passageway, said fairing structure having spaced apertures aligned with apertures formed in said casing, and a plurality of hollow strut members extending radially between the respective apertures in said casing and said fairing structure, the outer ends of said strut members being secured to said casing and the inner ends being secured to said fairing structure for supporting the latter while insuring ventilation of said manifold cooling passageway.

ROBERT A. SFORZINI.

REFERENCES CITED

The following references are of record in the file of this patent:

UNITED STATES PATENTS

| Number | Name | Date |
|---|---|---|
| 2,410,450 | Kroon | Nov. 5, 1946 |
| 2,413,225 | Griffith | Dec. 24, 1946 |
| 2,435,557 | Eyre | Feb. 3, 1948 |